(12) United States Patent
VanBelle et al.

(10) Patent No.: US 7,740,260 B2
(45) Date of Patent: Jun. 22, 2010

(54) VEHICLE STEP WITH HINGED PEDESTAL MOUNT

(75) Inventors: Michael VanBelle, Ypsilanti, MI (US); Louis Caballero, Saline, MI (US); Sven Sauerwein, Newmarket (CA); David Barrett, London (GB)

(73) Assignees: Ford Global Technologies, Dearborn, MI (US); Multimatic, Inc., Markham, Ontario (CA)

( * ) Notice: Subject to any disclaimer, the term of this patent is extended or adjusted under 35 U.S.C. 154(b) by 656 days.

(21) Appl. No.: 11/681,358

(22) Filed: Mar. 2, 2007

(65) Prior Publication Data

US 2007/0278760 A1 Dec. 6, 2007

Related U.S. Application Data

(63) Continuation-in-part of application No. 11/421,902, filed on Jun. 2, 2006.

(51) Int. Cl.
*B60R 3/02* (2006.01)

(52) U.S. Cl. .............. 280/166; 280/163; 280/763.1; 180/90.6

(58) Field of Classification Search ............ 180/90.6; 280/763.1–766.1, 163–169
See application file for complete search history.

(56) References Cited

U.S. PATENT DOCUMENTS

| 4,110,673 | A | * | 8/1978 | Magy et al. ............... 318/466 |
|---|---|---|---|---|
| 4,116,457 | A | * | 9/1978 | Nerem et al. ............. 280/166 |
| 4,180,143 | A | * | 12/1979 | Clugston .................. 182/91 |
| 5,498,012 | A | * | 3/1996 | McDaniel et al. ......... 280/166 |
| 5,511,750 | A | | 4/1996 | Evenson |
| 5,547,040 | A | * | 8/1996 | Hanser et al. ............. 182/88 |
| 5,716,064 | A | * | 2/1998 | Frerichs ................... 280/166 |
| 5,842,709 | A | * | 12/1998 | Maccabee ................. 280/166 |
| 5,895,064 | A | | 4/1999 | Laubach |
| 6,082,751 | A | | 7/2000 | Hanes et al. |
| 6,213,486 | B1 | * | 4/2001 | Kunz et al. ............... 280/166 |
| 6,460,915 | B1 | | 10/2002 | Bedi et al. |
| 6,533,303 | B1 | * | 3/2003 | Watson ..................... 280/166 |
| 6,641,158 | B2 | | 11/2003 | Leitner |
| 6,659,224 | B2 | * | 12/2003 | Medsker ................... 182/91 |
| 6,663,125 | B1 | | 12/2003 | Cheng |
| 6,830,257 | B2 | * | 12/2004 | Leitner ..................... 280/166 |
| 6,834,875 | B2 | * | 12/2004 | Leitner et al. ............. 280/166 |
| 6,942,233 | B2 | | 9/2005 | Leitner et al. |
| 7,441,790 | B2 | * | 10/2008 | Lechkun ................... 280/166 |
| 2003/0132595 | A1 | * | 7/2003 | Fabiano et al. ........... 280/166 |
| 2004/0100063 | A1 | * | 5/2004 | Henderson et al. ....... 280/166 |
| 2005/0087951 | A1 | * | 4/2005 | Leitner et al. ............. 280/166 |
| 2005/0104318 | A1 | * | 5/2005 | Lee et al. .................. 280/166 |

* cited by examiner

*Primary Examiner*—S. Joseph Morano
*Assistant Examiner*—Jacob Meyer
(74) *Attorney, Agent, or Firm*—Jerome R. Drouillard; Greg Brown

(57) ABSTRACT

A vehicle step assembly uses hinged pedestals and attitude links to position step stringers and an attached step beam in a generally horizontal and elevated deployed position, while permitting a space-saving tucked-in stowed position.

18 Claims, 3 Drawing Sheets

VEHICLE STEP WITH HINGED PEDESTAL MOUNT

RELATED APPLICATION(S)

The present application is a Continuation-In-Part of U.S. patent application Ser. No. 11/421,902, filed Jun. 2, 2006, and incorporated herein by reference.

BACKGROUND OF THE INVENTION

1. Field of the Invention

The present invention relates to a step apparatus which may be deployed to allow ready access to a portion of a motor vehicle, such as a pickup box.

2. Disclosure Information

Vehicles such as pickup trucks and sport utility vehicles frequently utilize large tires and wheels and high ground clearance, so as to enable such vehicles to negotiate more rugged terrain and difficult road surfaces such as those piled with snow and loose soil. Although high ground clearance has the benefit of promoting vehicle mobility, a drawback is inherent with such construction, insofar as high ground clearance renders access to vehicle load carrying structures such as a pickup box, utility body, or roof rack, a difficult proposition. Various designers have attempted to provide foldaway steps which would allow vehicle operators to gain access to a pickup box or other vehicle body. Such foldaway steps have met with mixed success, and one reason for this shortfall is shown in U.S. Pat. No. 6,641,158, which discloses a step having a mechanism which actually lowers the height of the step when the step is moved from its stowed position to its deployed position. This lowering of height is undesirable because it partially defeats the purpose for the step by placing the user at less of an advantage than would be the case were the step to be moved upwardly as it is moved to its deployed position.

It would be desirable, therefore, to have a step which not only tucks up out of the way when in a stowed position, but moves upwardly into the deployed position.

SUMMARY OF THE INVENTION

According to a preferred embodiment, a vehicle step includes a base adapted for attachment to at least one structural member of a vehicle. A hinged pedestal has a first end pivotably mounted to the base and a free end, with the hinged pedestal being rotatable outwardly from a generally horizontal stowed position to a generally vertical deployed position. A step stringer is pivotably attached to the free end of the hinged pedestal and extends generally outwardly from the base. The step stringer has a stowed position and a deployed position. An attitude link has a first end pivotably mounted to the base and a second end pivotably mounted to the step stringer. The attitude link controls relative rotation of the step stringer such that a generally planar tread surface, incorporated in the step and attached to the step stringer, is maintained in a horizontal orientation when the hinged pedestal is in its generally vertical deployed position. The attitude control link also orients the tread surface at a downward angle and inwardly when the hinged pedestal is in its generally horizontal, or stowed, position.

According to another aspect of the present invention, the hinged pedestal deployed with the present step also includes a stop abutment, formed at the first end of the hinged pedestal, for preventing rotation of the pedestal outwardly beyond its generally vertical position when the step is in its deployed position.

According to a preferred embodiment, the base of the present step preferably includes spaced apart brackets adapted to depend from at least one structural member of the vehicle. The hinged pedestal and attitude link are mounted upon opposing interior surfaces of the brackets.

According to another aspect of the invention, the present step may include a pair of hinged pedestals mounted to opposing interior surfaces of the spaced apart brackets, with a step stringer being attached to each of the hinged pedestals, and as explained above, with attitude links being associated with each of the step stringers and hinged pedestals.

According to another aspect of the present invention, the present step includes a latch mechanism for selectively maintaining the step being in its stowed position. The latch preferably includes a foot-operated toggle latch in the form of a push button extending through a step beam attached to the step stringers.

It is an advantage of the present step mechanism that the step is stowed in a tightly tucked position slightly upwardly raked, but with the deployed position of the step being at a higher or raised position with respect to the stowed position of the step.

It is another advantage of a step according to the present invention that the step may be mounted on any of the sides of a pickup box such as the longitudinal sides or the corners or even at the rear of the pickup box or an SUV, so as to permit access not only to an interior box, but also to the roof of a vehicle.

Other advantages, as well as features and objects of the present invention, will become apparent to the reader of this specification.

DETAILED DESCRIPTION OF THE PREFERRED EMBODIMENTS

Figure 1:
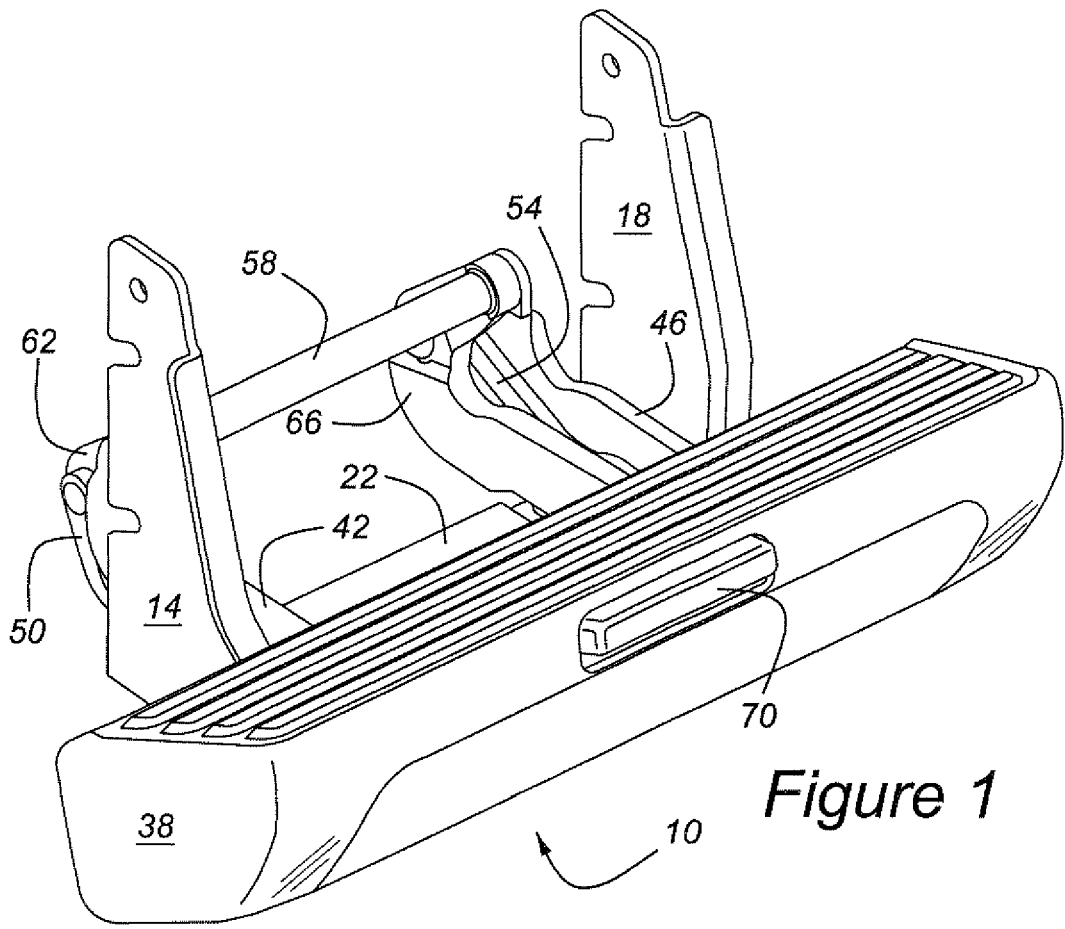
FIG. 1 is a perspective view of a step system according to the present invention shown in the stowed position.
Figure 4:
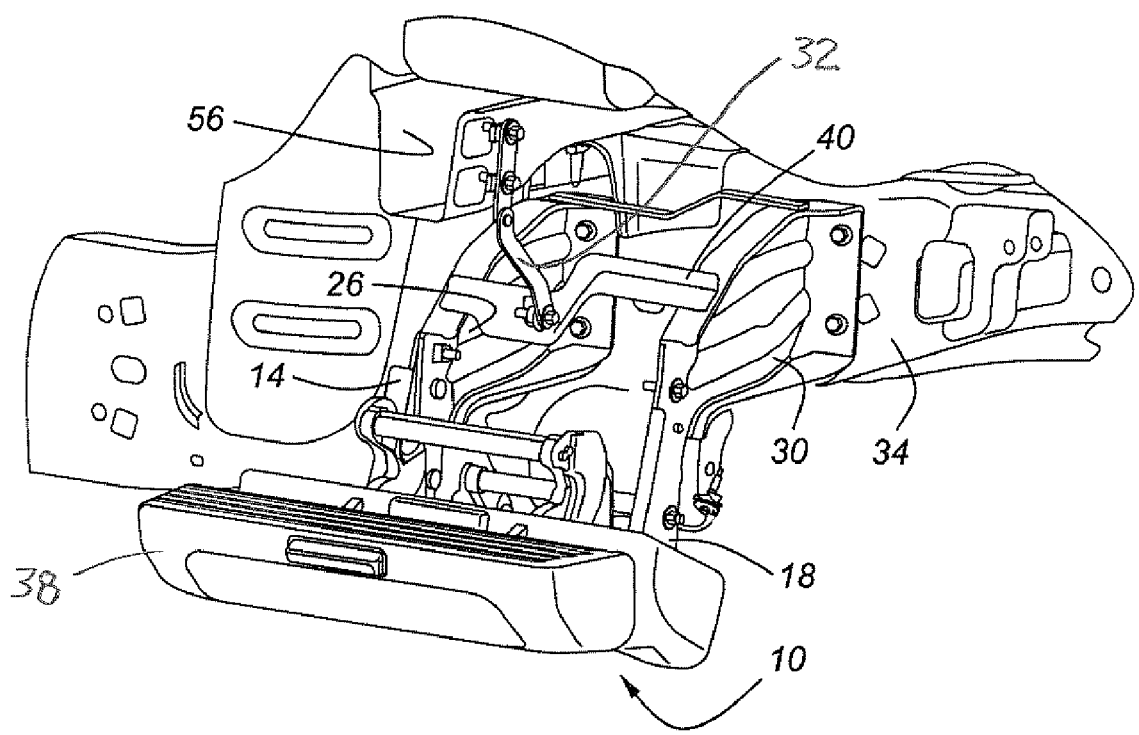
FIG. 4 is a perspective view of a step according to the present invention shown in its deployed position.

As shown in FIG. 1, step assembly 10 is mounted upon a base including left step bracket 14, right step bracket 18, and tie bar 22, which extends between the left and right step brackets. As shown in FIG. 4, left step bracket 14 is attached to left standoff bracket 26, which is in turn bolted to a frame rail 34 of a vehicle. Conversely, right step bracket 18 is mounted to right standoff bracket 30, which is also bolted to frame rail 34. Articulated support member 32, also shown in FIG. 4, extends between structural member 36 and tie bracket 40, which spans left standoff bracket 26 and right standoff bracket 30. Member 32 is articulated to facilitate installation of the present step assembly upon a vehicle.

Figure 2:
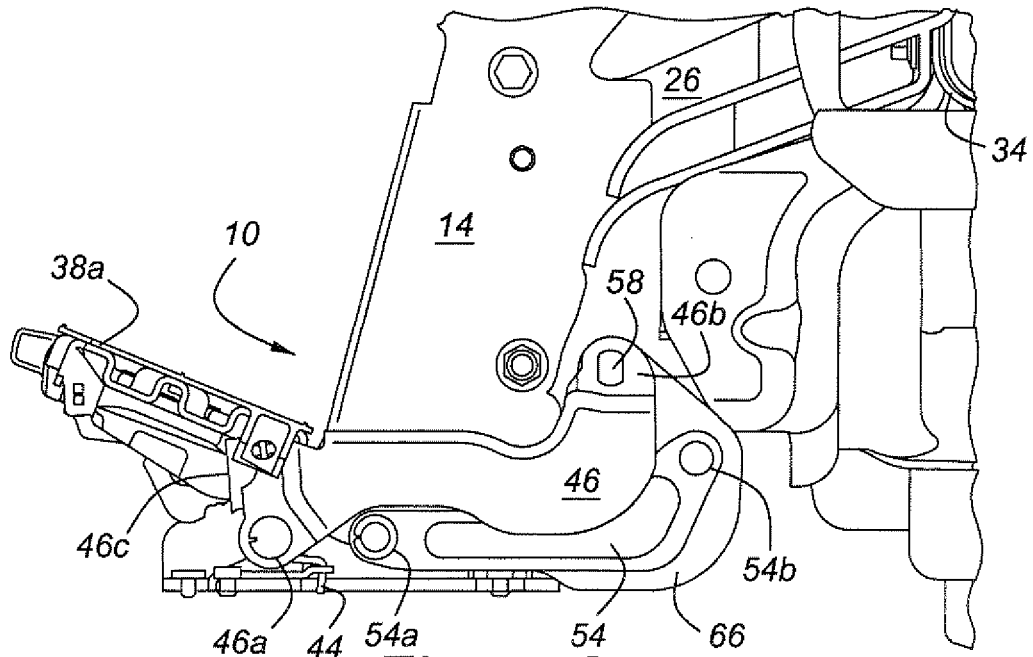
FIG. 2 is a side view, partially broken away, of the step shown in FIG. 1, also in the stowed position.

FIG. 1 shows step assembly 10 in its stowed position, with step beam 38 in a tucked and upwardly angled position. Step beam 38 is attached to left step stringer 62 and right step stringer 66. Stringer 66 is shown with particularity in FIGS. 2 and 3. In FIG. 2, stringer 66 is in a generally horizontal stowed position in which stringer 66 abuts a lower portion of right step bracket 18 (not shown due to the cutaway of FIG. 2).

Figure 3:
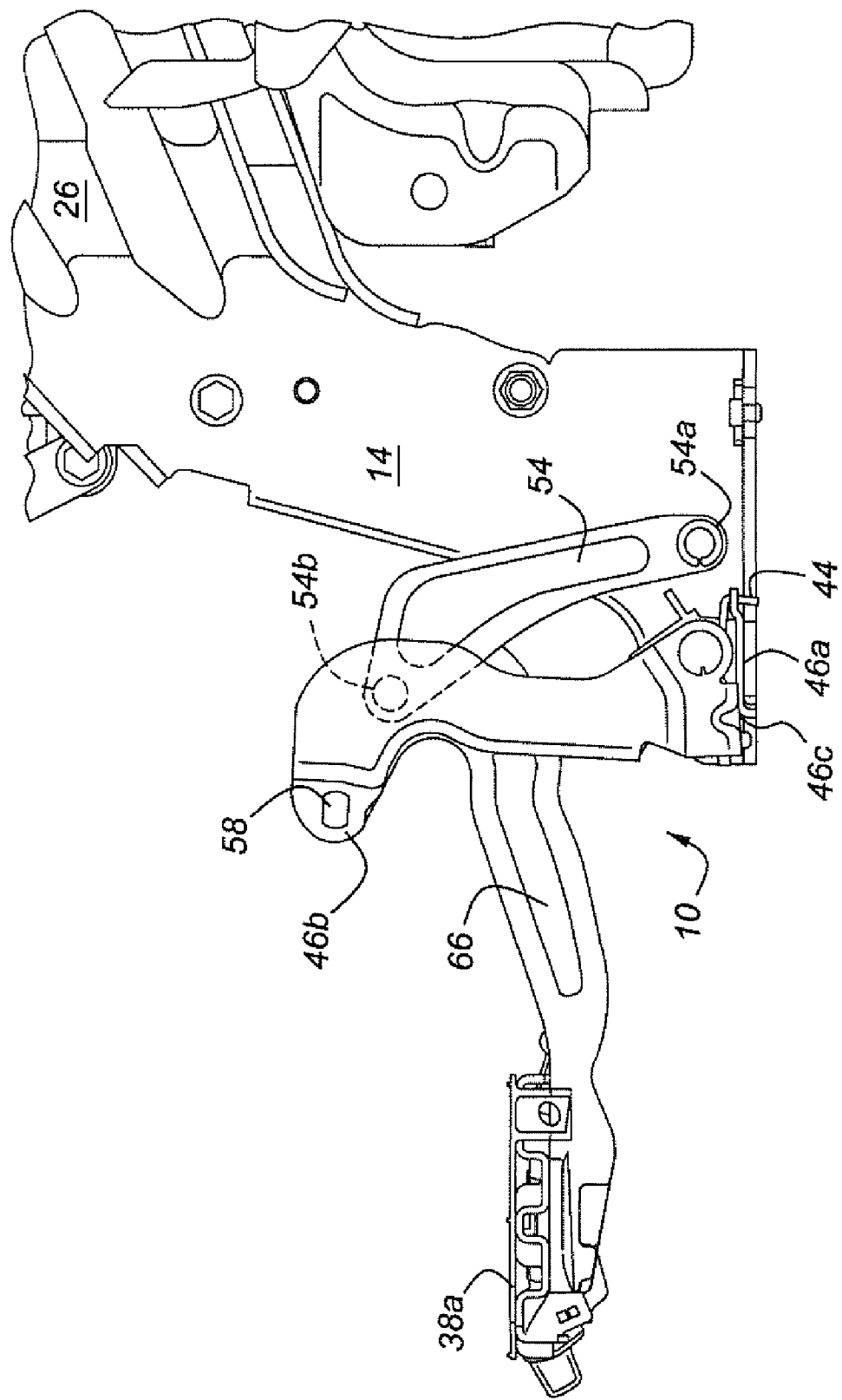
FIG. 3 is similar to FIG. 2, but shows the step of FIGS. 1 and 2 in the deployed position.

As seen in FIGS. 2 and 3, right step stringer 66 is pivotably attached to a free end, 46b, of hinged pedestal 46. Pivot 58 maintains step stringer 66 in rotatable contact with right hinged pedestal 46. Right attitude link 54, which has a first end, 54a, mounted to right step bracket 18, and a second end, 54b, pivotably mounted to right step stringer 66, controls the relative rotation of step stringer 66 such that the generally planar tread surface, 38a, which is part of step beam 38, is maintained in the illustrated horizontal orientation of FIG. 3 when hinged pedestal 46 is in the generally vertical deployed position of FIG. 3. Conversely, when hinged pedestal 46 is in its generally horizontal stowed position of FIG. 2, right attitude link 54 maintains tread surface 38a angled downwardly and inwardly. This assures that step beam 38, including tread surface 38a, is tucked up and out of the way when the present step system is in the stowed position.

By comparing FIGS. 2 and 3 one may readily ascertain a benefit provided by hinged pedestals 42 and 46. Because these pedestals rotate forwardly and upwardly until the stop abutments, such as 46c shown operationally in FIG. 3, contact a base portion of the step, step stringers 62 and 66 are lifted upwardly and outwardly in a simultaneous fashion, which causes step beam 38, including tread surface 38a, to be elevated when it is in its deployed position. This promotes better access to a vehicle with the present step, because it is simply more advantageous for a motorist to be elevated when attempting to reach across a pickup box or other utility body.

Figure 5:
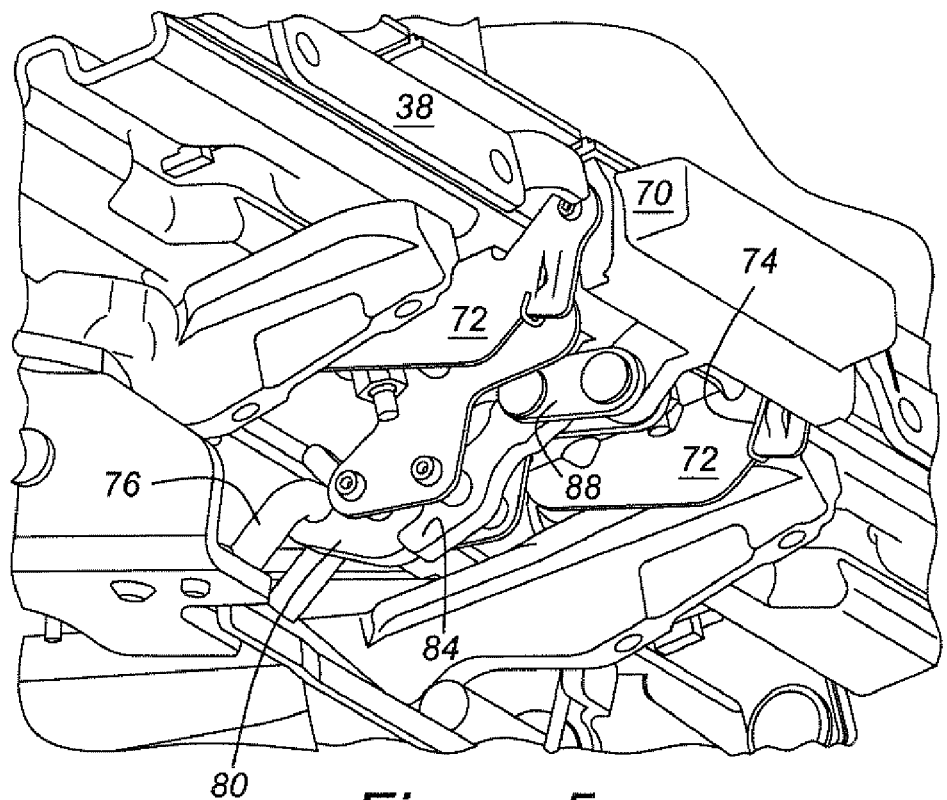
FIG. 5 is a perspective view showing a latch mechanism according to an aspect of the present invention.

The present step system is conveniently operated by a push button latch mechanism which selectively maintains step stringers 62 and 66, hinged pedestals 42 and 46, stringers 62 and 66, and step beam 38 in their respective stowed positions. As shown in FIG. 5, push button 70 is hingedly attached to brackets 72, which are mounted to the underside of step beam 38. Connecting link 88 is pivotably attached to a toggle, 84, which releasably detains latch 80. Striker 76, which is attached to left and right step brackets 14 and 18, maintains all of the various linkages and components in the stowed position as long as latch 80 is in its latched/closed position shown in FIG. 5. Depressing push button 70 will cause connecting link 88 and toggle 84 to release latch 80, thereby allowing the step system to be rotated outwardly to its deployed position. This rotation is aided by means of torsion springs 44 which are mounted to hinged pedestals 42 and 46, so as to resiliently urge pedestals 42 and 46 into their deployed position.

While particular embodiments of the invention have been shown and described, numerous variations and alternate embodiments will occur to those skilled in the art. Accordingly, it is intended that the invention be limited only in terms of the appended claims.

What is claimed is:

1. A vehicle step, comprising:
   a base adapted for attachment to at least one structural member of a vehicle;
   a hinged pedestal having a first end pivotably mounted to said base, and a free end, with said hinged pedestal being rotatable outwardly and upwardly from a generally horizontal stowed position to a generally vertical deployed position;
   a step stringer pivotably attached to said free end of said hinged pedestal and extending generally outwardly from said base, with said step stringer having a stowed position and a deployed position;
   an attitude link having a first end pivotably mounted to said base, and a second end pivotably mounted to said step stringer and an articulated support member extending between said base and at least one structural member of a vehicle.

2. A vehicle step according to claim 1, wherein said hinged pedestal further comprises a stop abutment formed at said first end of said hinged pedestal, for preventing rotation of said pedestal outwardly beyond said generally vertical position when said step is in said deployed position.

3. A vehicle step according to claim 1, wherein a portion of said step stringer abuts said base when said hinged pedestal is in said generally horizontal stowed position.

4. A vehicle step according to claim 1, further comprising a step beam attached to said step stringer, with said step beam having a generally planar tread surface, and with said step beam having a stowed position and a deployed position.

5. A vehicle step according to claim 4, wherein said attitude link controls the relative rotation of the step stringer such that said generally planar tread surface is maintained in a horizontal orientation when said hinged pedestal is in said generally vertical deployed position, and angled downwardly and inwardly when said hinged pedestal is in said generally horizontal stowed position.

6. A vehicle step according to claim 1, further comprising a latch mechanism for selectively maintaining said step stringer, said hinged pedestal, and said step beam in their respective stowed positions.

7. A vehicle step according to claim 6, wherein said latch mechanism is operated by a push button.

8. A vehicle step according to claim 7, wherein said push button extends through a step beam attached to said step stringer.

9. A vehicle step according to claim 1, wherein said base comprises a plurality of spaced-apart brackets adapted to depend from at least one structural member of a vehicle, with said hinged pedestal and said attitude link being mounted upon opposing interior surfaces of said brackets.

10. A vehicle step according to claim 9, wherein said base is rigidly attached to said at least one structural member.

11. A vehicle step according to claim 1, further comprising a plurality of springs for resiliently urging said hinged pedestals into said deployed position.

12. A vehicle step, comprising:
   a base adapted for attachment to at least one structural member of a vehicle, with said base comprising a plurality of spaced-apart brackets having opposing interior surfaces;
   a plurality of hinged pedestals, with each pedestal having a first end pivotably mounted to one of said opposing interior surfaces, and a free end, with said hinged pedestals being rotatably movable outwardly and upwardly from a generally horizontal stowed position to a generally vertical deployed position;
   a plurality of step stringers, with one of said stringers being pivotably attached to the free end of each of said hinged pedestals, and with said step stringers extending generally outwardly and upwardly from said base, with said step stringers having a stowed position and a deployed position;
   a step beam attached to said step stringers, with said step beam having a generally planar tread surface, and with said step beam having a stowed position and a deployed position; and
   a plurality of attitude links, with each link having a first end pivotably mounted to one of said opposing interior surfaces, and a second end pivotably mounted to one of said step stringers, with said hinged pedestals, and said step stringers, and said attitude links cooperating to position said step stringers such that said step stringers move outwardly and upwardly when the hinged pedestals and the step stringers move from their respective stowed positions to their respective deployed positions.

13. A vehicle step according to claim 12, further comprising a latch mechanism for selectively maintaining said step beam in said stowed position.

14. A vehicle step according to claim 13, wherein said latch mechanism comprises a foot-operated toggle latch.

15. A vehicle step according to claim 12, further comprising an articulated support member extending between said base and at least one structural member of a vehicle.

16. A vehicle step according to claim 12, further comprising a plurality of springs for resiliently urging said hinged pedestals into said deployed position.

17. A vehicle step according to claim 12, wherein said hinged pedestal further comprises a stop abutment formed at said first end of said hinged pedestal, for preventing rotation of said pedestal outwardly beyond said generally vertical position when said step is in said deployed position.

18. A vehicle step according to claim 12, wherein a portion of said step stringer abuts said base when said hinged pedestal is in said generally horizontal stowed position.

* * * * *